Patented Oct. 6, 1953

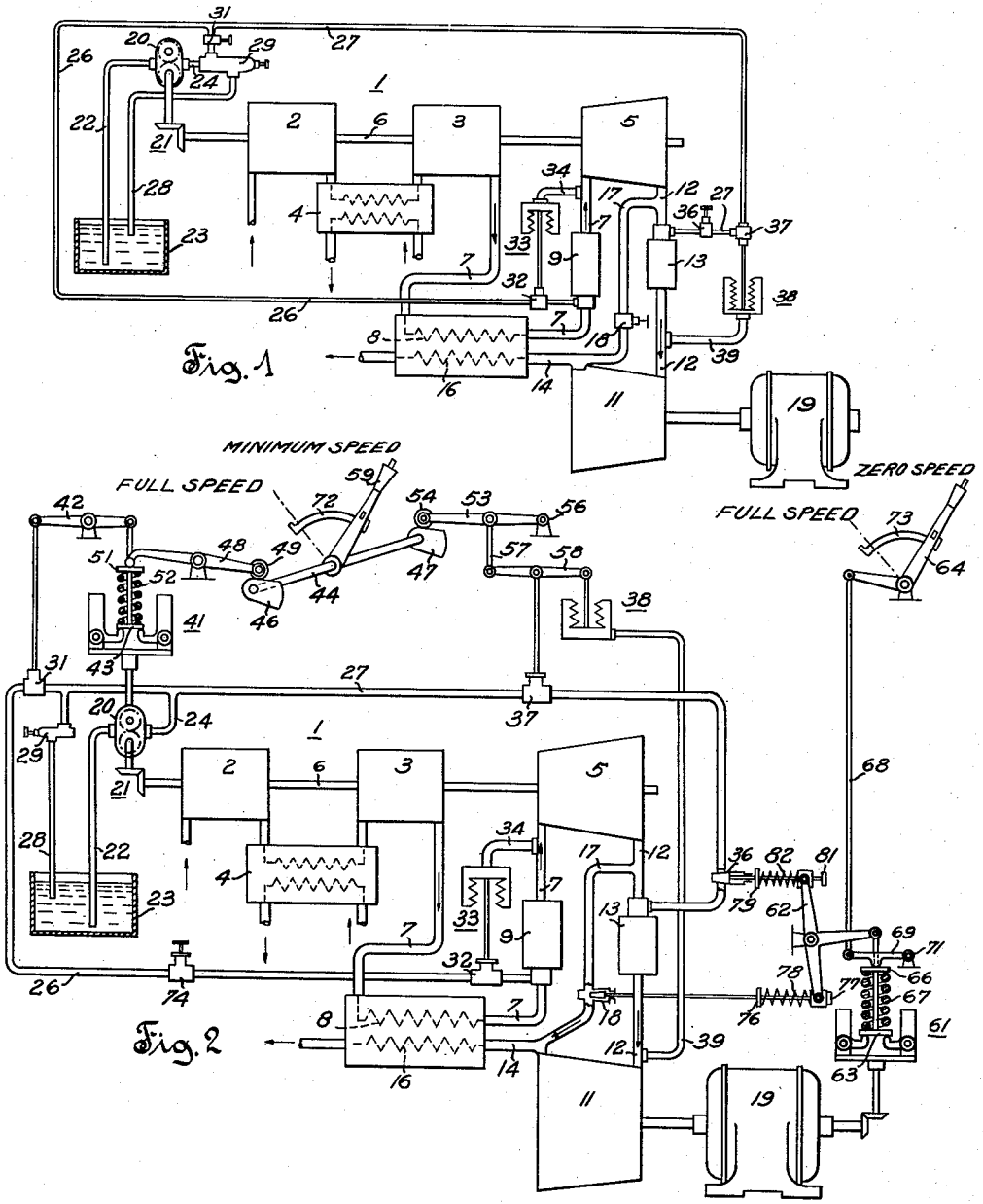

2,654,217

UNITED STATES PATENT OFFICE 2,654,217

GAS TURBINE SYSTEM WITH TREATMENT BETWEEN TURBINE STAGES

John T. Rettaliata, Wauwatosa, Wis., assignor to Allis-Chalmers Manufacturing Company, Milwaukee, Wis., a corporation of Delaware Application July 15, 1944, Serial No. 545,057

10 Claims. (Cl. 60—39.17)

1

This invention relates to continuous combustion gas turbine power plants of the type embodying a high pressure turbine and a low pressure turbine independent of the high pressure turbine with respect to speed of operation and receiving exhaust gas therefrom, and a plurality of heating means including a primary heating apparatus for variably heating the motive fluid entering the high pressure turbine and a secondary heating apparatus for variably reheating gas to be expanded in the low pressure turbine, and has for its primary object the provision of an improved mode of operating and controlling such a power plant in order to render the maximum torque of the power turbine readily available at all times thus conditioning the power plant to effect a rapid acceleration of the vehicle or other means driven thereby whenever desired and in order to obtain optimum efficiency for part load operation.

A further object of this invention is to provide such a power plant with control apparatus combined and correlated in a manner for attaining the improved operation and control hereinbefore mentioned.

The manner of accomplishing the objects herein specified will become readily apparent as the disclosure progresses and particularly points out additional advantages and features considered of special importance and of general application although shown and described in connection with a gas turbine power plant adapted for marine use.

Accordingly the invention may be considered as consisting of the various modes of operation and control and of the various combinations of elements and parts constructed and/or correlated, as is more fully set forth in the appended claims and in the detailed description, reference being had to the accompanying drawing illustrating but two embodiments of the invention and in which:

Fig. 1 schematically illustrates a continuous combustion gas turbine power plant constituting one embodiment of the invention; and Fig. 2 schematically illustrates an application of control apparatus to the power plant shown in Fig. 1 and constituting the other embodiment of the invention.

Referring to Fig. 1, it is seen that the invention may be practiced with apparatus comprising a compressor 1 having a low pressure section 2, a high pressure section 3, and an intercooler 4 connecting the discharge of section 2 with the inlet of section 3, a high pressure tur-

2 bine 5 drivingly connected with compressor 1 by means of a common shaft 6, a conduit 7 including a heat exchanging portion 8 and a primary combustion chamber 9 connecting the discharge of the high pressure section 3 with the inlet of turbine 5, a low pressure turbine 11, a conductor 12 including a reheat combustion chamber 13 connecting the exhaust of high pressure turbine 5 with the inlet of low pressure turbine 11, a conduit 14 connected with the exhaust of low pressure turbine 11 and including a heat exchanging portion 16 operatively associated with the portion 8 of conduit 7, a bypass conduit 17 including a valve 18 directly connecting the exhaust of high pressure turbine 5 with the heat exchanging portion 16 of conduit 14, and a generator or other excess power utilizing device 19 drivingly connected with low pressure turbine 11.

Fuel is delivered to primary combustion chamber 9 and to reheat combustion chamber 13 by any suitable means such as a pump 20 driven from shaft 6 by means of gearing 21, a pipe 22 connecting the inlet of pump 20 with a fuel reservoir 23, and a pipe 24 connecting the discharge of pump 20 with branch pipes 26 and 27 leading to combustion chambers 9 and 13, respectively. Surplus fuel is returned to reservoir 23 through a pipe 28 including a constant pressure maintaining valve 29. Pipe 24 is provided with a manually operated valve 31 and pipe 26 is provided with a temperature limiting valve 32 actuated by any suitable means such as an expansive fluid or other device 33 rendered responsive to a predetermined maximum temperature of the motive fluid entering turbine 5 by means of a conductor or the like 34. Pipe 27 is also provided with a manually operated valve 36 and with a temperature limiting valve 37 actuated by a device 38 rendered responsive to a predetermined maximum temperature of the motive fluid entering turbine 11 by means of a conductor or the like 39. The devices 33 and 38 operate valves 32 and 37 to effect a reduction in heat input whenever the temperature of the motive fluid exceeds a predetermined maximum.

Valves 31 and 36 are severally operable to vary the quantity of fuel and therefore the heat input to combustion chambers 9 and 13 and the valves 32 and 37 are severally automatically operable to limit the maximum temperature of the motive fluid entering turbines 5 and 11. Valve 18 is operable independently of valves 31, 32, 36 and 37 and therefore, if it is assumed that the power plant of Fig. 1 is operating under no load conditions with the turbine 11 stationary, that is with valve 31 partially open, valve 36 fully closed and valve 18 fully open (valves 32 and 37 are normally fully open), all that remains to be done to render turbine 11 operative is to increase the heat input to combustion chamber 9 by further opening valve 31 and to partially close bypass valve 18. The power developed by turbine 11 increases and decreases as the valves 31 and 18 are moved toward their fully open and fully closed positions, respectively, and when these two valves are positioned to obtain maximum power from both turbines 5 and 11, the power developed by turbine 11 may be further increased by opening valve 36. When valves 31 and 36 are in their fully opened positions and valve 18 is in its fully closed position, turbines 5 and 11 both develop maximum power.

Consequently, it should now be obvious that once the unit comprising compressor 1 and turbine 5 is rendered self operative (operation of this unit may be readily initiated in the usual manner by means of an internal combustion engine or other suitable starting motor, not shown), the speed and power developed by turbine 5 may be varied over a wide range simply by manipulating valve 31 and for any operative position of valve 31, that is any position in which the fuel input exceeds the minimum requirements of the unit comprising compressor 1 and turbine 5, the speed and power developed by turbine 11 may be independently varied between zero and maximum limits simply by manipulating valves 18 and 36. Of course valves 31, 36 and 18 may be simultaneously actuated if it is so desired.

Referring to Fig. 2 in which like numerals are used to designate the same or corresponding parts in the interest of simplicity, it is seen that the power plant of Fig. 1 may be provided with additional control apparatus comprising a speed responsive governor 41 for turbine 5, a lever 42 operatively connecting valve 31 (in this case valve 31 positioned in pipe 26 instead of in pipe 24) with the flyball actuated part 43 of governor 41, a rock shaft 44 mounting a pair of cams 46, 47, a lever 48 having on one end a roller 49 engaging cam 46 and having its other end engaging an adjustable seat 51 supporting one end of a biasing spring 52 of governor 41, a lever 53 having on one end a roller 54 engaging cam 47 and having its other end pivotally secured to a fixed fulcrum 56, a link 57 connecting an intermediate portion of lever 53 with one end of a floating lever 58 having its other end operatively connected with temperature responsive device 38 and its intermediate portion operatively connected with valve 37, a control handle 59 for turning rock shaft 44, a speed responsive governor 61 for turbine 11, a lever 62 operatively connecting valves 18 and 36 with the flyball actuated part 63 of governor 61, and a control lever 64 operatively connected with an adjustable seat 66 supporting one end of a biasing spring 67 of governor 61 by means of a link 68 and a lever 69 having one end connected with link 68, having an intermediate portion engaging spring seat 66 and having its other end pivotally secured to a fixed fulcrum 71. Handle 59 and lever 64 are each operatively associated with a quadrant for the like 72 and 73 for severally retaining the handle and lever in selected positions. Pipe 26 is preferably provided with a separate valve 74 for terminating the delivery of fuel to combustion chamber 9 irrespective of the position of valve 31.

When handle 59 is positioned as shown, valve 31 is in its minimum open position, valve 37 is preferably fully closed and governor spring 52 is biased to maintain the unit comprising compressor 1 and turbine 5 self-operative at a minimum speed insuring stability. Any counterclockwise movement of handle 59 results in a further opening of valve 31, the opening or further opening of valve 37 and an increase in the degree of bias imparted to spring 52 of governor 41 while any clockwise movement of handle 59 effects an opposite result. Stated differently, a counterclockwise movement of handle 59 operates to increase the fuel being delivered to combustion chamber 9 and thereby the temperature of the motive fluid entering turbine 5 and to increase the speed setting of governor 41 and thereby the speed of turbine 5 while a clockwise movement of handle 59 effects just the opposite result; the increase or decrease in the temperature of the motive fluid and in the speed of turbine 5 being dependent upon the extent to which handle 59 is moved in either direction. Whether the operation of turbine 11 is in any manner affected by the opening and closing movements of valves 31 and 37 is of course dependent upon the positions of valves 18 and 36.

The stem of valve 18 is provided with a pair of axially spaced abutments 76, 77 between which is disposed a coaxial spring 78 and the stem of valve 36 is also provided with similar abutments 79, 81 and an interposed spring 82. The opposite ends of lever 62 here shown as carrying sleeves which are disposed between the outer abutments 77, 81 and the opposed ends of springs 78 and 82 and are slidably connected with the adjacent portions of the valve stems for movement relative thereto; the arrangement of these parts being such that the valves 18 and 36 are sequentially closed and opened by the movement of lever 62 which is in turn jointly actuated by governor 61 and control lever 64. For example, any movement of control lever 64 is transmitted through link 68, lever 69, adjustable spring seat 66, and spring 67 to the flyball actuated part 63 of governor 61 which is in turn connected with an arm of lever 62; the relation of these parts being such that either a counterclockwise movement of control lever 64 or a speed decreasing produced movement of the flyballs results in a clockwise movement of lever 62 and that either a clockwise movement of control lever 64 or a speed increasing produced movement of the flyballs results in a counterclockwise movement of lever 62. If lever 62 is moved in a clockwise direction with valves 18 and 36 correlated and positioned as shown in Fig. 2, valve 18 gradually closes and valve 36 remains closed until valve 18 is fully closed whereupon a continued clockwise movement of lever 62 gradually opens valve 36 while further compressing spring 78. A counterclockwise movement of lever 62 will obviously produce a sequence of operation which is the opposite of that just described. Any actuation of lever 62 tends to move valves 18 and 36 in opposite directions, but the lost motion connections afforded by the springs 78, 82 and abutments 76, 77, 79 and 81 are illustrated as being correlated to prevent a simultaneous opening of these two valves.

When control lever 64 is positioned as shown, valve 18 is fully open, valve 36 is fully closed and turbine 11 is stationary and will remain stationary irrespective of the movement of handle 59. However, when handle 59 is in any operative position, turbine 11 can be readily started and its speed and power varied between zero and a maximum value determined by the position of handle 59 simply by moving control lever 64 in the desired direction. When control lever 64 is in its full speed position, valve 18 is fully closed, valve 36 is fully open and the speed and power developed by both turbines can be simultaneously varied simply by moving handle 59 in the desired direction; the cams 46 and 47 being preferably so shaped that the fuel input to combustion chamber 9 and to combustion chamber 13 is such as will result in maximum efficiency for all settings of handle 59. In addition, it should be understood that for all operative positions of either handle 59 or control lever 64, governors 41 and 61 automatically control valves 31 and 36, respectively, to maintain the speed of turbine 5 and the speed of turbine 11 substantially constant at the value determined by the setting of its respective governor.

Optimum efficiency for part load operation, that is with turbine 11 operating at a reduced speed, is obtained by maintaining control lever 64 in its full speed position and moving handle 59 to simultaneously regulate the speed and power developed by both turbines. The same regulation can be effected with the apparatus shown in Fig. 1 by manipulating valve 31 while maintaining valve 36 fully opened and valve 18 fully closed. Stated differently, the most efficient part load operation is obtained by maintaining the temperature of the gas entering the compressor and power turbines relatively low and high, respectively. However, the inertia of the unit comprising compressor 1, and turbine 5, which is relatively great, limits the rate of load increase, that is it retards acceleration to a state of sluggishness, and renders the system unsuitable for applications subjecting the power turbine to sudden large increases in load, such for example as is experienced in maneuvering ships and the like. In accordance with this invention, the objection of sluggishness is readily overcome by providing the power turbine with a bypass control (conduit 17 and valve 18) and the reheat combustion chamber with a control (fuel valve 36) for independently varying the degree of reheat and effecting an increase in load and/or speed by closing the bypass valve and increasing the reheat temperature thereby minimizing throttling effect on the power turbine while obtaining accelerating torque characteristics similar to those of a steam turbine.

In practicing the invention with apparatus such as shown in Fig. 2, the control handle 59 may be maintained in any selected operative position and the speed and/or load on the power turbine varied between zero and the maximum value determined by the position of handle 59 simply by moving control lever 64 so as to produce the desired effect. When control lever 64 is in a speed reducing position, the power turbine can be immediately rapidly accelerated to the extent determined by the position of handle 59 simply by quickly moving control lever 64 to its full speed position. Maximum acceleration is available when handle 59 is in its full speed position and a reduction in power turbine speed has been effected by use of control lever 64. When the parts are thus positioned, governor 41 maintains full speed operation of the unit comprising compressor 1 and turbine 5 and governor 61 actuates valve 18 or 36 to control the temperature or the quantity of motive fluid entering the power turbine. In this connection, valve 36 is actuated by governor 61 as the load on the power turbine varies throughout a predetermined high range whereas valve 18 is actuated by governor 61 as the load on the power turbine varies throughout a predetermined low range; there being two such ranges for each operative position of handle 59. Whether the power turbine is operating within the high or low load range is of course determined by the position of control lever 64.

In any case in which the speed of the power turbine is being controlled by lever 64 with handle 59 in an intermediate or reduced speed position, the handle 59 can be moved to its full speed position whereupon the unit comprising compressor 1 and turbine 5 will accelerate to provide a maximum flow of air thus conditioning the system for maximum acceleration which can be readily obtained by a subsequent movement of lever 64 to its full speed position. For example, rapid acceleration can be readily obtained when operating at a reduced speed with handle 59 in an intermediate position simply by simultaneously moving handle 59 to its full speed position and control lever 64 to its zero speed position (such movement of lever 64 opens bypass valve 18 thereby reducing back pressure on the compressor turbine) and then hesitating an instant before moving lever 64 to its full speed position. The same results may also be achieved with the apparatus shown in Fig. 1 simply by appropriately manipulating valves 18, 31 and 36.

The invention is applicable to all types of continuous combustion gas turbine power plants embodying a high pressure turbine and a low pressure turbine independent of the high pressure turbine with respect to speed of operation, connecting the exhaust of the high pressure turbine with the inlet of the low pressure turbine, a source of motive fluid connected with the high pressure turbine and including a compressor driven by one of the turbines and a primary heating apparatus receiving motive fluid from the compressor, and a secondary heating apparatus for increasing the temperature of gas exhausted from the high pressure turbine. And it should therefore be understood that it is not intended to limit the invention to details of the apparatus and methods herein shown and described as various modifications within the scope of the appended claims may occur to persons skilled in the art.

It is claimed and desired to secure by Letters Patent:

1. In a gas turbine power plant embodying a high pressure turbine and a low pressure turbine having separately rotatable driving shafts respectively, means connecting the exhaust of said high pressure turbine with the inlet of said low pressure turbine, a source of motive fluid for said turbines including a compressor driven by one of said turbines and a primary heating apparatus receiving motive fluid from said compressor, a secondary heating apparatus for variably increasing the temperature of gas exhausted from said high pressure turbine, a first control comprising primary control means for varying the heat input of both of said primary and secondary heating apparatus, a part optionally positionable for controlling said primary control means so as to simultaneously change the heat input of both of said heating apparatus, and a high pressure turbine governor responsive to the speed of said high pressure turbine and controlled by said part and operable to further control said primary control means for varying the heat input of said primary heating apparatus so as to maintain said high pressure turbine operating at a speed determined by the position of said part, and a second control comprising auxiliary control means positionable to vary the heat input of said secondary heating apparatus between upper and lower limits of which the upper limit is determined by the position of said part.

2. In a gas turbine power plant embodying a high pressure turbine and a low pressure turbine having separately rotatable driving shafts respectively, means connecting the exhaust of said high pressure turbine with the inlet of said low pressure turbine, a source of motive fluid for said turbines including a compressor driven by one of said turbines and a primary heating apparatus receiving motive fluid from said compressor, a secondary heating apparatus for variably increasing the temperature of gas exhausted from said high pressure turbine, a first control comprising primary control means for varying the heat input of both of said primary and secondary heating apparatus, a part optionally positionable for controlling said primary control means so as to simultaneously change the heat input of both of said heating apparatus, and a high pressure turbine governor responsive to the speed of said high pressure turbine and controlled by said part and operable to further control said primary control means for varying the heat input of the primary heating apparatus so as to maintain the speed of said high pressure turbine substantially constant at a value determined by the position of said part, and a second control comprising auxiliary control means for additionally varying the heat input of said secondary heating apparatus, an element optionally positionable for controlling said auxiliary control means so as to further limit the heat input of said secondary heating apparatus, and a low pressure turbine governor responsive to the speed of said low pressure turbine and controlled by said element and operable to further control said auxiliary control means so as to maintain said low pressure turbine operating at a substantially constant speed determined by the position of said element.

3. In a gas turbine power plant embodying a high pressure turbine and a low pressure turbine having separately rotatable driving shafts respectively, means connecting the exhaust of said high pressure turbine with the inlet of said low pressure turbine, a source of motive fluid for said turbines including a compressor driven by one of said turbines and a primary heating apparatus receiving motive fluid from said compressor, a secondary heating apparatus for variably increasing the temperature of gas exhausted from said high pressure turbine, and a bypass for conducting motive fluid around said low pressure turbine, a first control comprising primary control means selectively positionable to simultaneously change the heat input of both of said primary and secondary heating apparatus, and a second control comprising auxiliary control means for further varying the heat input of said secondary apparatus and for controlling and varying the flow of motive fluid through said bypass, and an element selectively positionable for controlling said auxiliary control means so as to decrease and terminate the heat input of said secondary heating apparatus and to initiate and increase the flow of motive fluid through said bypass.

4. In a gas turbine power plant embodying a high pressure turbine and a low pressure turbine having separately rotatable driving shafts respectively, means connecting the exhaust of said high pressure turbine with the inlet of said low pressure turbine, a source of motive fluid for said turbines including a compressor driven by one of said turbines and a primary heating apparatus receiving motive fluid from said compressor, a secondary heating apparatus for variably increasing the temperature of gas exhausted from said high pressure turbine, and a bypass for conducting motive fluid around said low pressure turbine, a first control comprising primary control means selectively positionable to simultaneously change the heat input of both of said primary and secondary heating apparatus, and a second control comprising auxiliary control means for varying the heat input of said secondary heating apparatus and for controlling and varying the flow of motive fluid through said bypass, an element for controlling said auxiliary control means and being selectively positionable so as to decrease and terminate the heat input of said secondary heating apparatus and to initiate and increase the flow of motive fluid through said bypass, and a low pressure turbine governor operable to further control said auxiliary control means so as to maintain said low pressure turbine operating at a substantially constant speed determined by the position of said element.

5. In a gas turbine power plant embodying a high pressure turbine and a low pressure turbine having separately rotatable driving shafts respectively, conduit means including a reheat combustion chamber connecting the exhaust of said high pressure turbine with the inlet of said low pressure turbine, a source of motive fluid for said turbines including a compressor driven by one of said turbines and a primary combustion chamber receiving a combustion supporting motive fluid constituent from said compressor, means for delivering fuel to said combustion chambers, and a bypass for conducting motive fluid around said low pressure turbine, a first control comprising primary fuel-flow varying means for both of said combustion chambers, a part selectively positionable throughout a predetermined range of movement for controlling said primary fuel-flow varying means so as to simultaneously change the fuel input to both of said chambers, and a high pressure turbine governor operable to further control said primary fuel-flow varying means for varying fuel input to said primary combustion chamber so as to maintain said high pressure turbine operating at a substantially constant speed determined by the position of said part, and a second control comprising an auxiliary fuel-flow varying means for said reheat combustion chamber, a motive fluid flow-varying means for said bypass, an element selectively positionable throughout a predetermined range of movement for controlling said auxiliary and bypass flow-varying means so as to decrease and terminate the fuel input to said reheat combustion chamber and to initiate and increase the flow of motive fluid through said bypass as said element is moved from one to the other end of said range, and a low pressure turbine governor operable to further control said auxiliary fuel-flow varying means so as to maintain said low pressure turbine operating at a substantially constant speed determined by the position of said element.

6. In a gas turbine power plant embodying a high pressure turbine and a low pressure turbine having separately rotatable driving shafts respectively, means connecting the exhaust of said high pressure turbine with the inlet of said low pressure turbine, a source of motive fluid for said turbines including a compressor driven by one of said turbines and a primary heating apparatus receiving motive fluid from said compressor, a secondary heating apparatus for variably increasing the temperature of gas exhausted from said high pressure turbine, and a bypass for conducting motive fluid around said low pressure turbine, a first control comprising primary control means for varying the heat input of both of said primary and secondary heating apparatus, a part selectively positionable for controlling said primary control means to simultaneously change the heat input of both of said apparatus, and a high pressure turbine governor operable to vary the heat input of said primary heating apparatus so as to maintain the speed of said high pressure turbine substantially constant at a value determined by the position of said part, and a second control comprising auxiliary control means for varying the heat input of said secondary heating apparatus and for controlling and varying the flow of motive fluid through said bypass, an element selectively positionable for controlling said auxiliary control means so as to decrease and terminate the heat input of said secondary heating apparatus and so as to initiate and increase the flow of motive fluid through said bypass, and a low pressure turbine governor having an adjustable biasing means responsive to the movements of said element, said governor being operable to further control said auxiliary control means so as to maintain said low pressure turbine operating at a substantially constant speed determined by the position of said element.

7. A method of operating a continuous combustion gas turbine power plant embodying a high pressure turbine and a low pressure useful power turbine operable at constant speed with varying load having separately rotatable driving shafts respectively, conduit means connecting the exhaust of said high pressure turbine with the inlet of said low pressure turbine, a source of motive fluid for said turbines including a compressor driven by said high pressure turbine, a primary heating apparatus receiving motive fluid from said compressor, and a secondary heating apparatus for increasing the temperature of gas exhausted from said high pressure turbine, which comprises, increasing the temperature of the motive fluid entering said high pressure turbine so as to attain maximum speed operation thereof, and increasing the power output of the low pressure turbine by increasing heat input thereto to take care of increase in load thereon and accelerating said increase by manually first bypassing fluid exhausted from said high pressure turbine around said low pressure turbine to reduce the back pressure on said high pressure turbine, then manually quickly stopping said bypassing and manually increasing the heat input to said secondary heating apparatus.

8. In a gas turbine power plant embodying a high pressure turbine and a low pressure useful power turbine operable at constant speed with varying load having separately rotatable driving shafts respectively, means connecting the exhaust of said high pressure turbine with the inlet of said low pressure turbine, a source of motive fluid for said turbines including a compressor driven by said high pressure turbine and a primary heating apparatus receiving motive fluid from said compressor, and a secondary heating apparatus for variably increasing the temperature of gas exhausted from said high pressure turbine, a first control comprising primary control means optionally positionable to simultaneously definitely set to a selected maximum the heat input of both of said heating apparatuses, and a second control comprising an auxiliary control means optionally positionable to definitely set to a selected amount the heat input of said secondary heating apparatus between a lower limit of zero and an upper limit determined by the setting of said primary control means.

9. In a gas turbine power plant embodying a high pressure turbine and a low pressure useful power turbine operable at constant speed with varying load having separately rotatable driving shafts respectively, means connecting the exhaust of said high pressure turbine with the inlet of said low pressure turbine, a source of motive fluid for said turbines including a compressor driven by said high pressure turbine and a primary heating apparatus receiving motive fluid from said compressor, and a secondary heating apparatus for variably increasing the temperature of gas exhausted from said high pressure turbine, bypass means around said secondary heating apparatus and said low pressure turbine, a first control comprising primary control means optionally positionable to simultaneously definitely set to a selected maximum the heat input of both of said heating apparatuses, a second control comprising an auxiliary control means optionally positionable to definitely set to a selected amount the heat input of said secondary heating apparatus between a lower limit of zero and an upper limit determined by the setting of said primary control means, and third control means optionally positionable to definitely set to a selected amount the fluid bypassed through said bypass means between a lower limit of zero and an upper maximum limit.

10. In a gas turbine power plant embodying a high pressure turbine and a low pressure useful power turbine having separately rotatable driving shafts respectively, means connecting the exhaust of said high pressure turbine with the inlet of said low pressure turbine, a source of motive fluid for said turbines including a compressor driven by said high pressure turbine and a primary heating apparatus receiving motive fluid from said compressor, and a secondary heating apparatus for variably increasing the temperature of gas exhausted from said high pressure turbine, a fuel conduit for supplying said primary heating apparatus, a fuel conduit for supplying said secondary heating apparatus, a first control comprising a primary control valve controlling both of said supply conduits, optionally positionable to simultaneously definitely set to a selected maximum the fuel supply to both of said heating apparatuses, and a second control comprising an auxiliary control valve interposed in the fuel supply conduit for said secondary heating apparatus, optionally positionable to definitely set to a selected amount the fuel supply to said secondary heating apparatus between a lower limit of zero and an upper limit determined by the setting of said primary control valve.

JOHN T. RETTALIATA.

References Cited in the file of this patent

UNITED STATES PATENTS

| Number | Name | Date |
|---|---|---|
| 2,095,991 | Lysholm | Oct. 19, 1937 |
| 2,123,009 | Johansson | July 5, 1938 |
| 2,147,935 | Steiner | Feb. 21, 1939 |
| 2,238,905 | Lysholm | Apr. 22, 1941 |
| 2,312,605 | Traupel | Mar. 2, 1943 |
| 2,399,046 | Larrecq | Apr. 23, 1946 |
| 2,447,124 | Kalitinsky et al. | Aug. 17, 1948 |

FOREIGN PATENTS

| Number | Country | Date |
|---|---|---|
| 519,806 | Great Britain | Apr. 5, 1940 |
| 531,964 | Great Britain | Jan. 15, 1941 |
| 541,307 | Great Britain | Nov. 21, 1941 |